A. W. ASMUSSEN.
PLANTER.
APPLICATION FILED JULY 31, 1912.
1,078,121.
Patented Nov. 11, 1913.
2 SHEETS—SHEET 1.
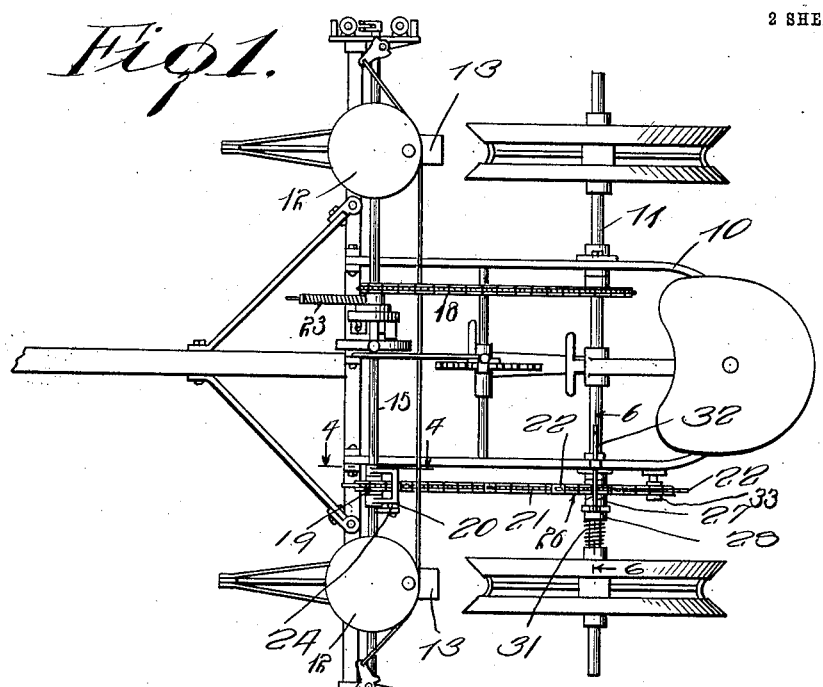
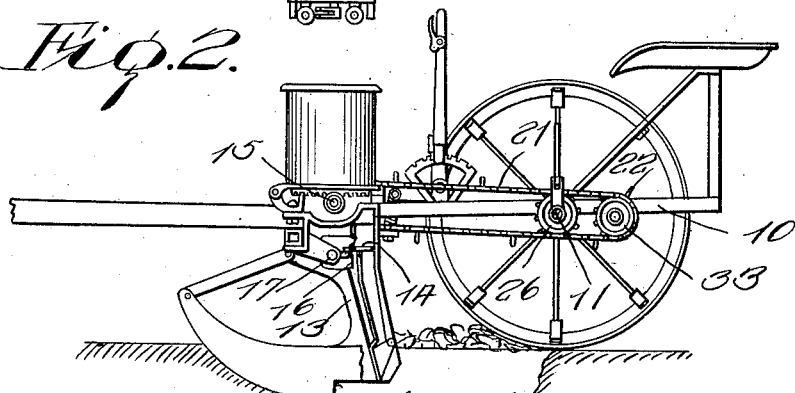
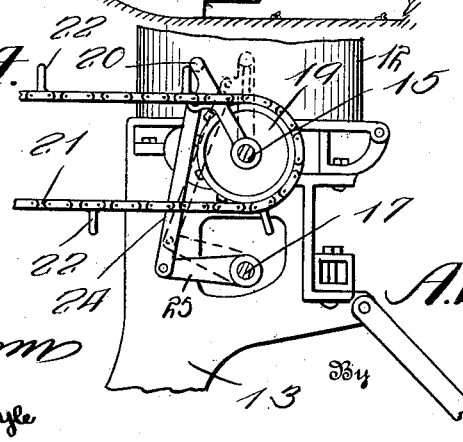
Witnesses
138 Irams
Francis Boyle
Inventor
A. W. Asmussen
By
Attorney

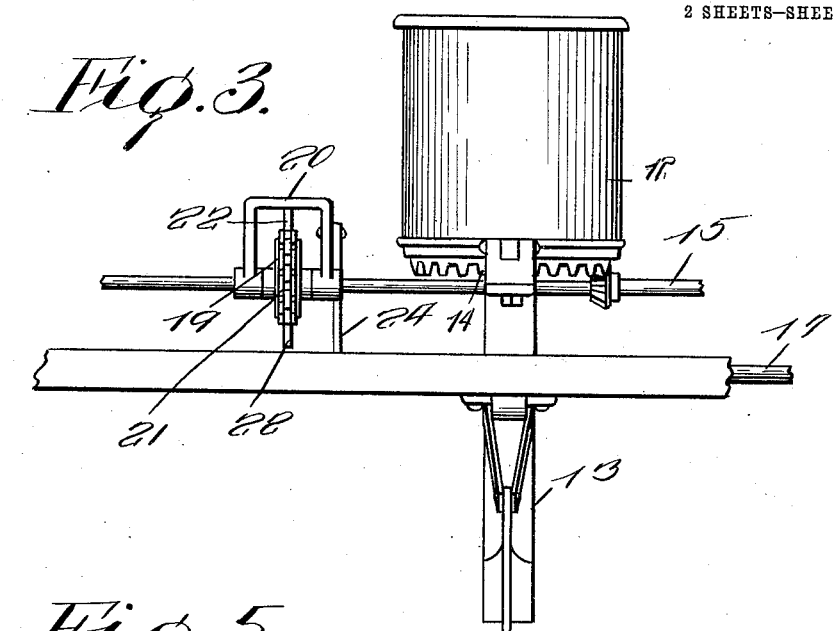
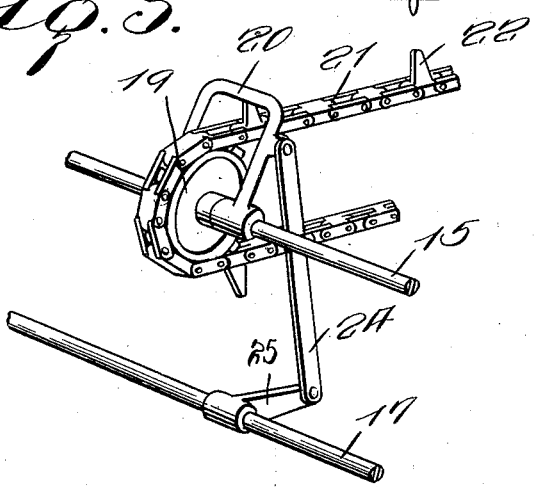
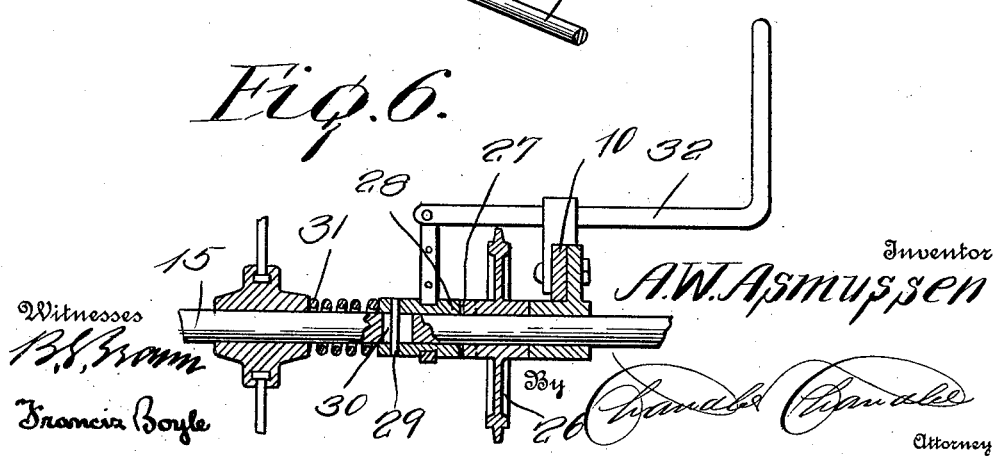

UNITED STATES PATENT OFFICE.

ALBERT W. ASMUSSEN, OF TREYNOR, IOWA.

PLANTER.

1,078,121.  Specification of Letters Patent.  Patented Nov. 11, 1913.

Application filed July 31, 1912. Serial No. 712,526.

*To all whom it may concern:*

Be it known that I, ALBERT W. ASMUSSEN, a citizen of the United States, residing at Treynor, in the county of Pottawattamie, State of Iowa, have invented certain new and useful Improvements in Planters; and I do hereby declare the following to be a full, clear, and exact description of the invention, such as will enable others skilled in the art to which it appertains to make and use the same.

This invention relates to planters and has for an object to provide an extremely simple and effective means for actuating the operating rod.

With the above object in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a plan view of the planter equipped with my improvements. Fig. 2 is a side elevation of the planter. Fig. 3 is a front elevation of the planter. Fig. 4 is a sectional view taken on the line 4—4 Fig. 1. Fig. 5 is a detail perspective view of the invention in applied position. Fig. 6 is a sectional view showing the method of operation of the invention.

Referring now to the drawings in which like characters of reference designate similar parts, an ordinary planter now in common use is conventionally illustrated and includes a main frame 10 carrying a wheeled axle 11 and having the usual seed hoppers 12 supported at the forward end of the frame and communicating with seed boots 13, the seed being dropped into the boots from the hoppers through the instrumentality of the usual rotary valves 14 which are actuated by an actuating shaft 15, and the seed being dropped out of the boots by tilting valves 16 which are actuated by a rocking rod 17. The shaft is actuated by a chain drive 18 from the axle 11, and the rod is actuated by means of a novel device which comprises the subject-matter of this invention.

Loosely mounted on the shaft is a sprocket gear 19. A yoke 20 straddles the sprocket gear in a normally rearwardly inclined position as shown most clearly in Fig. 5, the legs of the yoke being terminally equipped with openings which loosely receive the operating rod. The gear is actuated by a chain drive 21, the chain being equipped with upstanding fingers 22 which impinge against the bight of the yoke and carry the yoke forwardly, the fingers passing free from the yoke after a short interval as clearly shown in Fig. 5 and permitting of the yoke being returned to normal position by the controlling spring 23 of the rocking rod. This lifting movement imparted by the fingers 22 to the rearwardly inclined yoke, is transmitted to and raises bodily a link 24 which is connected at the upper end to one of the yoke legs near the bight of the yoke, and is connected at the lower end to a crank arm 25 which is fixed to the rocking rod, this bodily lifting movement of the link serving to rock the rod with a resultant rocking of the dropping valves 16 to open position. The controlling spring as above stated immediately returns the rocking rod to normal position upon discontinuance of lifting of the link 24 by the yoke 20. The fingers 22 may be spaced apart any desired distance upon the chain in order to regulate the dropping of the seed.

For throwing the above described dropper mechanism out of gear, a loose sprocket gear 26 is mounted on the axle 11 and is provided on one side with a ratchet face 27. A clutch sleeve 28 is slidably fitted upon the axle through the instrumentality of a pin 29 engaging in a slot 30 in the axle, the sleeve normally being held in active position by a spring 31 seated on the axle. An operating lever 32 is connected to the clutch sleeve and serves to move the same to inactive position against the tension of its spring when it is desired to throw the dropper mechanism out of gear. The loose gear 26 meshes with the sprocket chain 21, and in the present instance a second loose sprocket gear 33 is shown mounted on one side of the main frame and engages the rear bight of the sprocket chain.

What is claimed, is:—

In a planter, an actuating shaft, a rocking rod, a loose gear on said shaft, a chain drive actuating said gear, a normally rearwardly inclined yoke straddling said gear and having the legs loosely mounted on said rod, a crank arm on said rod, a link connected at the upper end to one of the legs of said yoke and connected at the lower end to said crank arm, and spaced fingers on said chain drive adapted to engage with and carry said yoke upwardly whereby to lift said link and rock said rod.

In testimony whereof, I affix my signature, in presence of two witnesses.

ALBERT W. ASMUSSEN.

Witnesses:
ALBERT LIMBURG,
ADOLPH LIMBURG.

Copies of this patent may be obtained for five cents each, by addressing the "Commissioner of Patents, Washington, D. C."